April 9, 1968 J. G. LILLARD ETAL 3,377,553

MOISTURE CONTENT DETERMINING DEVICE HAVING A PRESSURE-OPERATED CAPACITOR MEMBER

Original Filed Nov. 29, 1963 5 Sheets-Sheet 1

INVENTORS.
JAMES G. LILLARD,
ARNOLD R. ZUBIK,
BY Frank S. Troidl
ATTORNEY.

INVENTORS.
JAMES G. LILLARD,
ARNOLD R. ZUBIK,
BY Frank S. Troidl
ATTORNEY.

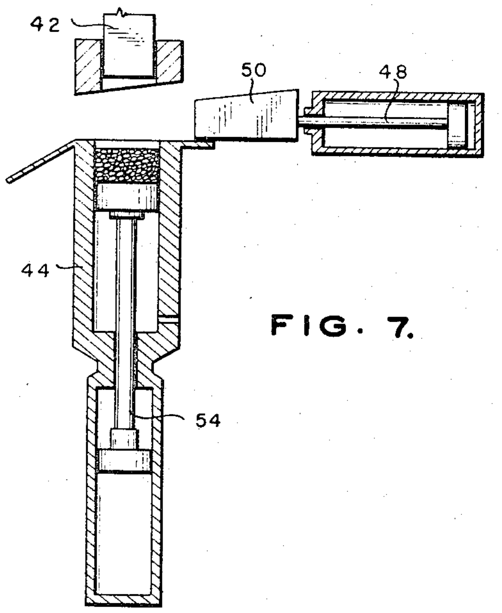
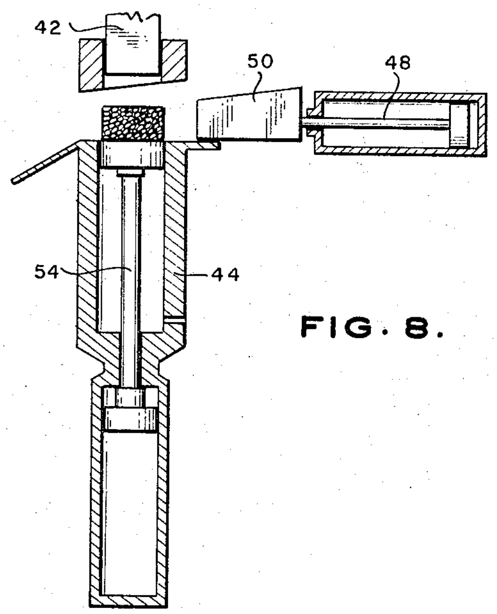
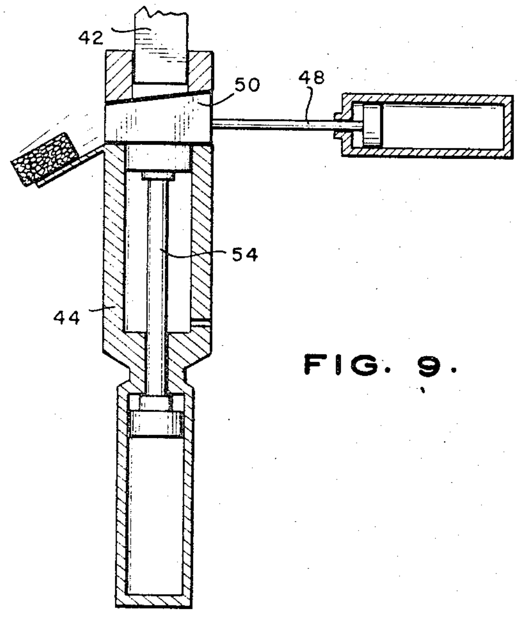
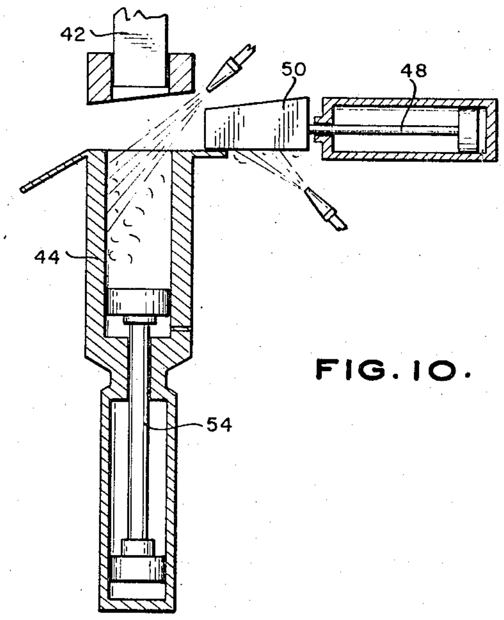
INVENTOR.
JAMES G. LILLARD,
ARNOLD R. ZUBIK,
BY Frank S. Triedl
ATTORNEY.

INVENTORS.
JAMES G. LILLARD,
ARNOLD R. ZUBIK,
BY
Frank S. Troidl
ATTORNEY.

INVENTORS.
JAMES G. LILLARD,
ARNOLD R. ZUBIK,
BY Frank S. Troidl
ATTORNEY.

United States Patent Office 3,377,553

Patented Apr. 9, 1968

3,377,553

MOISTURE CONTENT DETERMINING DEVICE HAVING A PRESSURE-OPERATED CAPACITOR MEMBER

James G. Lillard and Arnold R. Zubik, Baytown, Tex., assignors, by mesne assignments, to Esso Research and Engineering Company, Elizabeth, N.J., a corporation of Delaware Continuation of application Ser. No. 326,826, Nov. 29, 1963. This application July 20, 1966, Ser. No. 566,713
1 Claim. (Cl. 324—61)

This application is a continuation of application Ser. No. 326,826, filed Nov. 29, 1963, now abandoned.

This invention relates to the measurement of the moisture content of particulate material. More particularly, this invention is a method and system for accurately measuring the moisture content of bales of rubber under pressure.

During the processing of certain materials, the final product is placed in packages in the form of bales of the product. The processing often requires the use of water or other volatile materials. Most of the water or other volatile materials are removed during the process so that only a small amount of water remains in the final product. The purchaser of the final product usually requires that the moisture content of the final product be less than a predetermined amount. Therefore, it is desirable for the producer of the product to measure the moisture content of each bale of the product to make certain the moisture content does not exceed the predetermined amount.

As a specific example, in the production of bales of Butyl rubber, a slurry of rubber in water is conducted to a filter to remove most of the water. Some of the water, however, remains trapped in the rubber. The rubber in the form of loose cakes is fed from the filter to a dryer where most of the remaining water is removed. The rubber is then broken up into particles of rubber by mechanical action, automatically weighed, and then pressed into the form of bales in a baling press. The resulting bales of rubber are conveyed to a packaging area where they are placed in packages for shipment to the buyer.

The moisture content of the rubber must be determined to make certain that the moisture content does not exceed the predetermined amount. If the moisture content does exceed the predetermined amount, it is usually due to inefficient operation of the filter or dryer; and repairs must be made to the filter or dryer.

The invention to be described herein is a method and system for automatically and continuously measuring the moisture content of each bale of rubber during the rubber producing process. In practicing the process, a predetermined amount of particulate rubber is fed into the baling press. Pressure is then applied to the particulate rubber, and the electrical capacitance of the resulting bale of rubber is measured. The electrical capacitance is a function of the moisture content of the bale of rubber. After the electrical capacitance of the bale of rubber is measured, the applied pressure is released; and the bale of rubber is removed from the baling press.

The system includes the baling press which has a chamber for receiving the particulate material. A pressure-operated member applies pressure to the particulate material. An insulating dielectric is mounted on the pressure-operated member. A capacitor plate is mounted on the insulating dielectric. The dimensions of the capacitor plate and the dimensions of the insulating dielectric are such that the capacitor plate is insulated from the pressure-operated member. Means are provided for indicating the capacitance of the particulate material under pressure.

The invention, as well as its many advantages, may be further understood by reference to the following detailed description and drawings in which:

FIGS. 2 through 10 show the sequence of operations for introducing the particulate rubber into the baler, pressing the particulate rubber into the form of a bale, and removing the bale of rubber from the baler;

Figure 1:
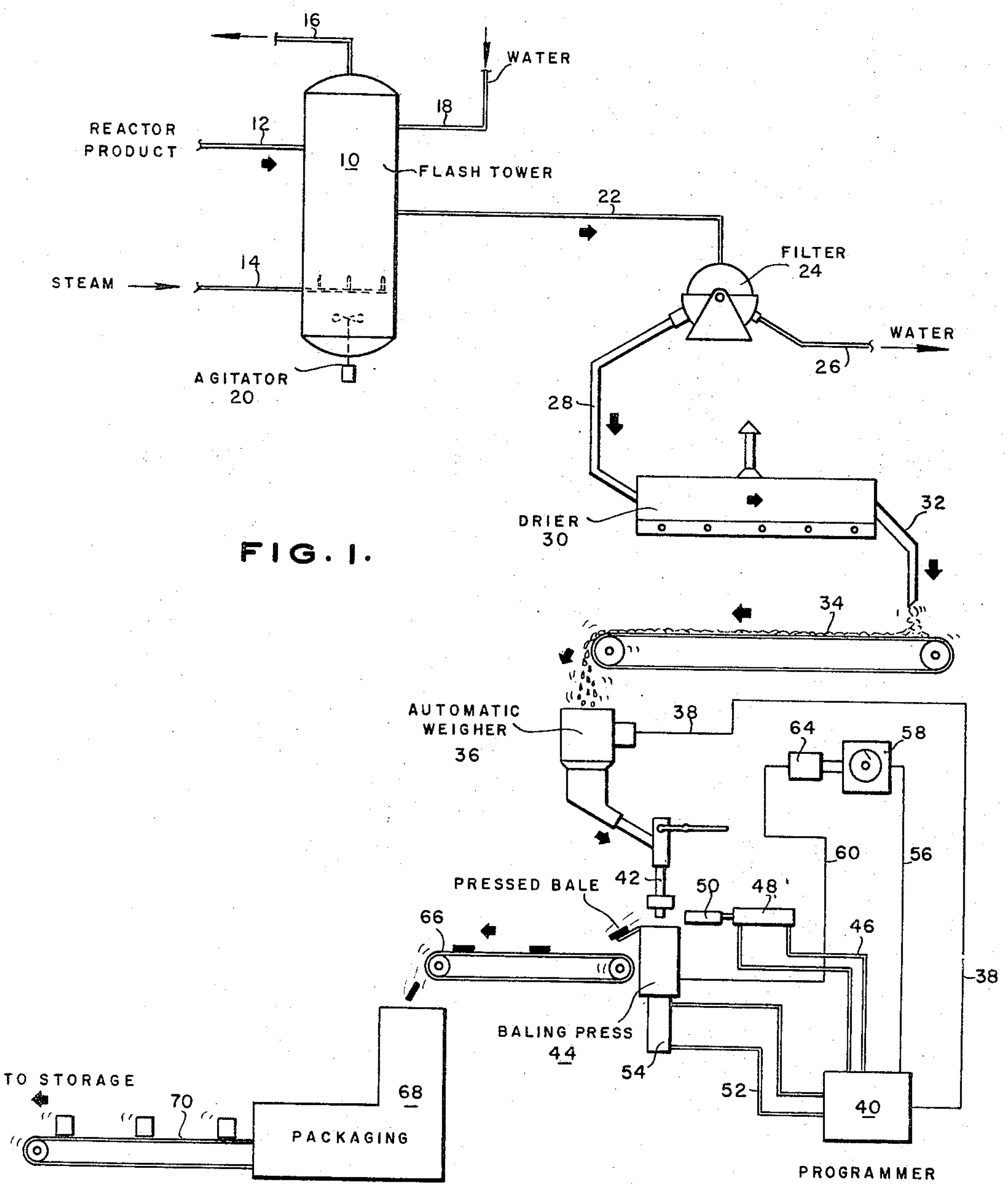
FIG. 1 is a schematic flow diagram of a butyl rubber finishing train.

Referring more specifically to FIG. 1, a flash tower 10 receives the product from a reactor (not shown). The reactor product is fed through conducting line 12 to the flash tower 10. The reactor product consists of particulate rubber in a liquid mixture of unreacted hydrocarbons and an inert carrier. The carrier and unreacted hydrocarbons are volatilized by heat supplied by steam flowed through line 14 into the flash tower 10. The volatilized carrier and unreacted hydrocarbons are removed from the flash tower 10 by means of overhead line 16. The rubber is suspended in water in the flash tower 10. The water is fed to the flash tower 10 by means of line 18. The rubber is kept suspended in the water by the agitator 20.

The rubber-in-water slurry flows from flash tower 10 through line 22 to a filter 24 such as an Oliver filter. The excess water is filtered off in the filter 24 and removed from the filter 24 by means of the water line 26. The water removed from the filter 24 may be discarded or recycled to the process.

The rubber, now in the form of loose cakes of discrete particles of assorted sizes, is fed from the filter 24 through line 28 to a dryer 30. Hot air at a carefully controlled temperature and rate is passed through the rubber cakes to vaporize and carry off most of the remaining water. The conditions employed are dependent upon the rate of production and the molecular weight of the reactor product and the efficiency of performance of the filter 24. These factors and the conditions of the dryer operation determine the moisture content of the product emerging from the dryer 30.

The product of the dryer 30 is fed through chute 32 to the conveyer 34. The product is mechanically shredded as it passes through chute 32 and is carried by conveyer 34 to the automatic weigher 36. The shredded dryer product consists of particles of rubber of different thicknesses, different densities, and different void volumes.

When the desired weight of particulate rubber has been fed to the automatic weigher 36, a signal is fed from the automatic weigher 36 through line 38 to the programmer 40. The chute 42 is then automatically lowered, and the rubber is dumped into the baling press 44. When the automatic weigher 36 is empty, the chute 42 is retracted. The programmer 40 then feeds a signal through line 46 to a hydraulic ram 48. The hydraulic ram 48 pushes the cover 50 over the top of baling press 44.

After the cover 50 has been placed over the top of baling press 44, the programmer 40 feeds a signal through line 52 to a main hydraulic ram 54. The main hydraulic ram 54. presses the particulate rubber contained in bailing press 44 into the form of a bale of rubber. The pressure on the rubber is maintained for a predetermined period of time. During this predetermined period of time at which pressure is maintained on the rubber, the programmer 40 feeds a signal through line 56 to the moisture meter 58. The moisture meter 58 then records the electrical capacitance of the bale of rubber in baling press 44. The electrical capacitance of the bale of rubber is fed through line 60 to an artificial line 64. The signal from artificial line 64 is fed to the moisture meter 58.

After the moisture content of the bale of rubber under pressure has been measured by moisture meter 58, the programmer 40 shuts off the moisture meter 58. The pressure on hydraulic ram 54 is then released, and ram 48 moves cover 50 from the bailing press 44. The ram 54 is then again operated to remove the bale of rubber from the baling press 44. The cover 50 is then again moved forward to push the bale of rubber from baling press 44 onto the conveyer 66.

The conveyer 66 carries the rubber bale to the packaging unit 68. The packaged rubber bale is fed by conveyer 70 to storage. The baling sequence is then repeated when the automatic weigher 36 is again filled with a predetermined amount of particulate rubber.

Figure 2:
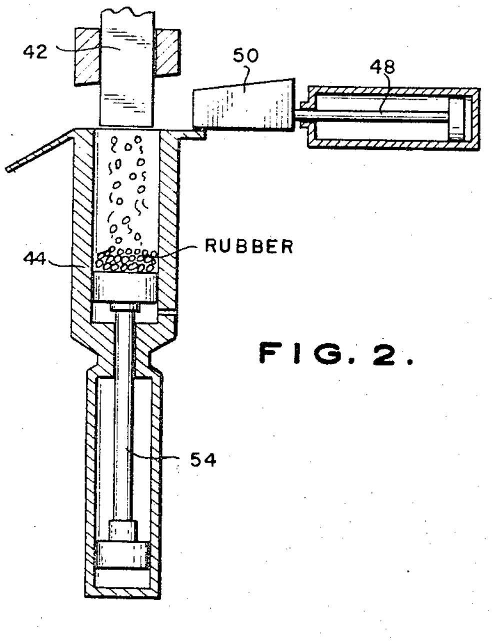
Figure 3:
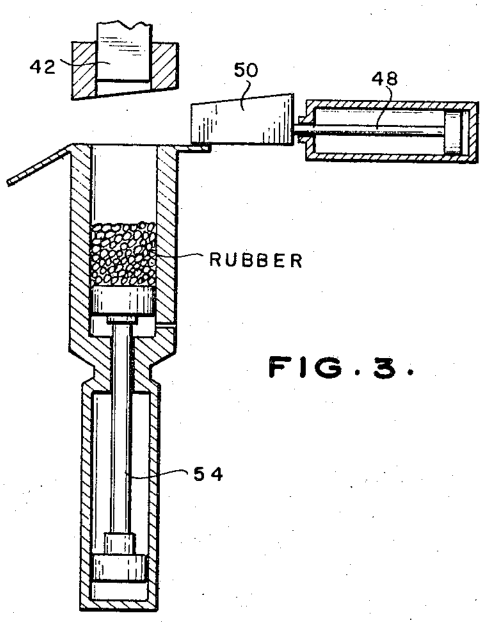

The operating sequence of the automatic baling system of FIG. 1 is shown in more detail in FIGS. 2 through 10. FIG. 2 shows the particulate rubber receiving position of the baling press 44. The chute 42 is in the down position, and the cover 50 is in the retracted position. FIG. 3 shows the loose rubber in the baling press 44. In FIG. 3, the chute 42 has been retracted.

Figure 4:
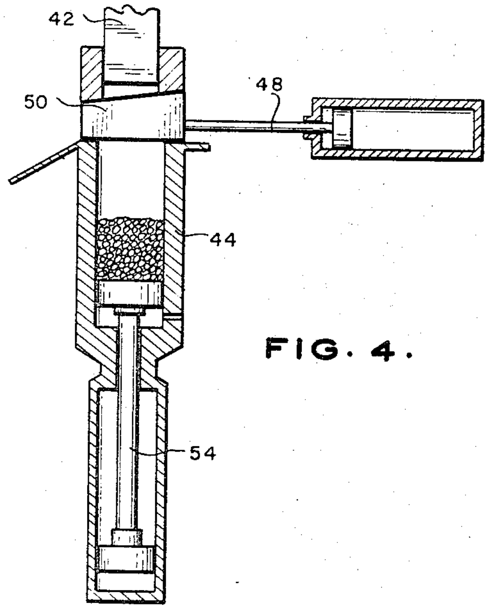
Figure 5:
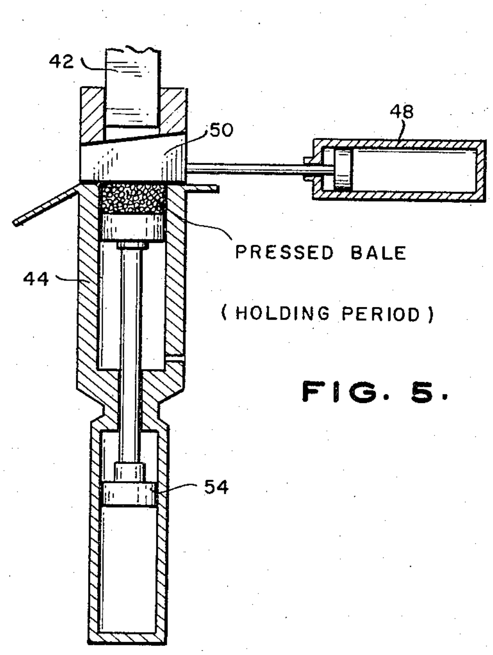

Thereafter, the hydraulic farm 48 is operated to extend the cover 50 into position to close the top of the baling press 44 as shown in FIG. 4. The main hydraulic ram 54 is then actuated. The ram 54 presses the particulate rubber at a predetermined pressure of, say, 1600 p.s.i. to form a bale of rubber. This step is shown in FIG. 5. The pressure is maintained for a predetermined period of time of, say, 20 seconds. During this time period, the programmer 40 (FIG. 1) operates the moisture meter 58 to measure the capacitance of the rubber under pressure.

Figure 6:
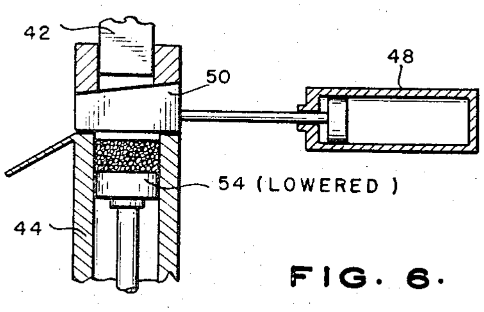

After the capacitance of the rubber is measured, the pressure on the main ram 54 is reduced to lower the main ram 54 a short distance to permit the bale to lower sufficiently to be free of the cover 50 (FIG. 6). The cover 50 is then retracted (FIG. 7). Thereafter, the main ram 54 is again actuated to push the bale of rubber out of the chamber formed in the baling press 44 (FIG. 8).

The hydraulic ram 48 is then extended, and the cover 50 moves the bale of rubber onto the conveyer 66 of FIG. 1. The step is shown in FIG. 9.

As shown in FIG. 10, a spray then coats the walls of the baling press 44 and the cover to prevent sticking. The cycle is then repeated.

Figure 11:
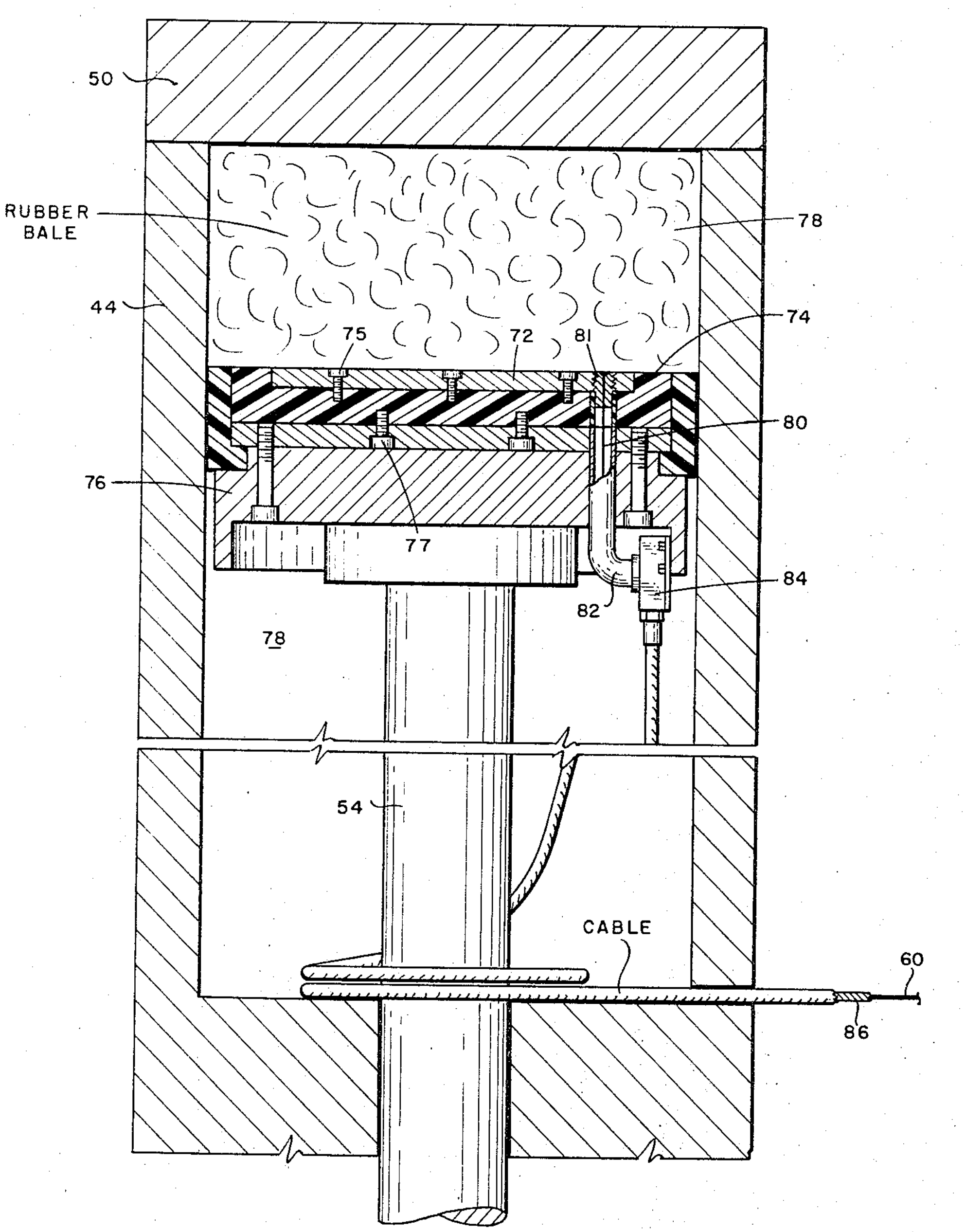
FIG. 11 is an elevational view, partly in section, showing in more detail a part of the capacitance measuring system.

The wide divergence in dielectric constants between rubber and water will cause significant change in the capacitance of a capacitor having rubber as its dielectric as the moisture content of the rubber varies. Referring to FIG. 11, a plate 72 constitutes one plate of the capacitor having the rubber bale as its dielectric. The upper portion of the stationary walls of the baling press 44 and the cover 50 constitute the other plate of the capacitor. The plate 72 is mounted on a block 74 of physically stable, nonconducting material by means of polypropylene bolts 75. The block 74 of physically stable, nonconducting materal is, in turn, mounted on the head member 76 of the main hydraulic ram 54 by means of polypropylene bolts 77.

The dimensions of the capacitor plate 72 and the dimensions of the block 74 of the insulating dielectric are such that the capacitor plate 72 is insulated from the head 76. The block 74 may suitably be polypropylene. Polypropylene is physically much more dimensionally stable under pressure than the rubber being pressed at the pressure and temperature of the process.

The walls of the baling press 44 provide a chamber 78 having an open top into which the particulate rubber is dumped and from which the pressed bale of rubber is ejected. In one application, the chamber 78 may have dimensions of 14 inches by 28 inches. The polypropylene block 74 may have dimensions of 14 inches by 28 inches by 2 inches. The dimensions of plate 72 may be 10 inches by 24 inches. The depth of the bale of rubber while under pressure may be about 6 inches.

A conductor 80 is connected to the plate 72 by means of a screw 81 having a hole formed through its middle. A shield 82 surrounds the conductor 80. The shield 82 is at ground potential. The shield 82 electrically connects all intimately touching metal parts comprising baling press 44, ram head 76, and main ram 54 to the ground terminal and case of the junction box 84. A coaxial cable including conductor 60 and surrounding shield 86 extends from the bottom of junction box 84.

The moisture meter is a device taking advantage of the wide difference in the dielectric constant of the water and the dielectric constant of the rubber. This difference causes a variation in the capacitance of a condenser of essentially fixed dimensions when the water content of the rubber changes. It can be shown mathematically that the water content of the rubber bale is in accordance with the formula:

$$\omega=\frac{SMl}{k\alpha A(\epsilon_\omega-\epsilon_R)}$$

where $S$=the percent of the scale of the moisture meter;
$M$=the capacitance differential represented by full scale deflection;
$l$=the thickness of the rubber dielectric;
$k$=a proportionality constant;
$\alpha$=a correction factor termed a cell constant to correct for end effects of capacitors having low $A/1$ ratios;
$A$=the area of the plate;
$\epsilon_\omega$=the dielectric constant of the water; and
$\epsilon_R$=the dielectric constant of the rubber.

Figure 12:
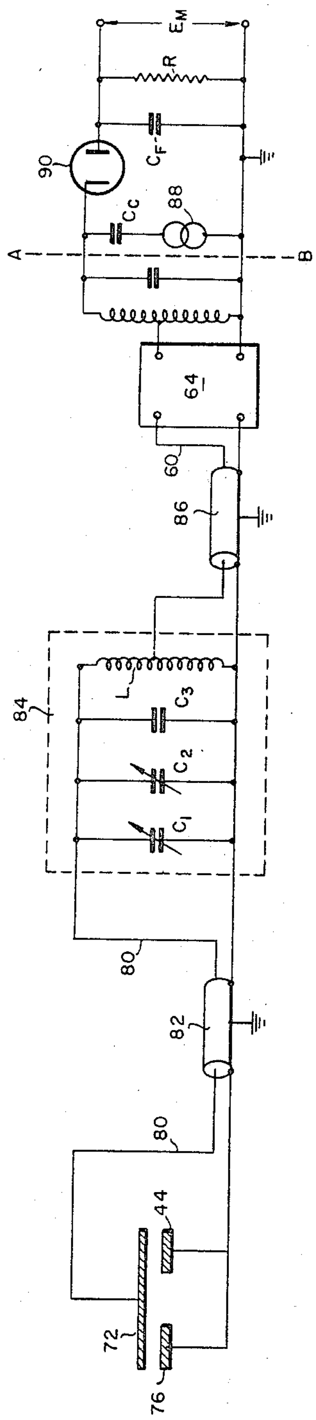
FIGS. 12 and 13 are electrical diagrams useful in explaining the operation of the capacitance measuring system.

The total capacitance measured is the sum of the capacitances of the rubber bale; the insulating block 74; the electrical leads; and capacitors $C_1$, $C_2$, and $C_3$ (FIG. 12). Capacitors $C_1$, $C_2$, and $C_3$ are a coarse zero adjustment capacitor, a fine zero adjustment capacitor, and a fixed zero elevation capacitor, respectively. The over-all capacitance is approximately equal to the maximum zero elevation which is determined by the characteristics of coil L.

The imposed voltage is provided by the power supply 88. This voltage may be a megacycle voltage of about 1.6 megacycles. The output voltage $E_M$ is a 60 cycle output voltage.

Figure 13:
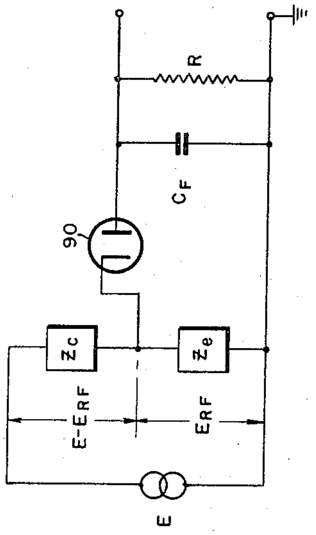

The impedance of the circuit to the left of the line A—B in FIG. 12 is represented by $Z_e$ in FIG. 13 and $Z_c$ is the impedance of capacitor $C_c$. The combined voltage drops across $Z_c$ and $Z_e$ must equal E. When $Z_e$ increases, $Z_e$ constitutes a larger portion of E. The 1.6 megacycle voltage $E_{RF}$ across $Z_e$ is then a function of the measured capacitance and acts as a source voltage to the diode 90, the filter capacitor $C_F$, and the resistor R.

Current can pass through the diode 90 in one direction only and is proportional to $E_{RF}$. This current contains a 1.6 megacycle component, a 60 cycle component, and, because of rectification a D.C. component. Essentially all the 1.6 megacycle component of the current flows as current through the filter condenser. The 60 cycle component flows through the resistor R.

Figure 14:
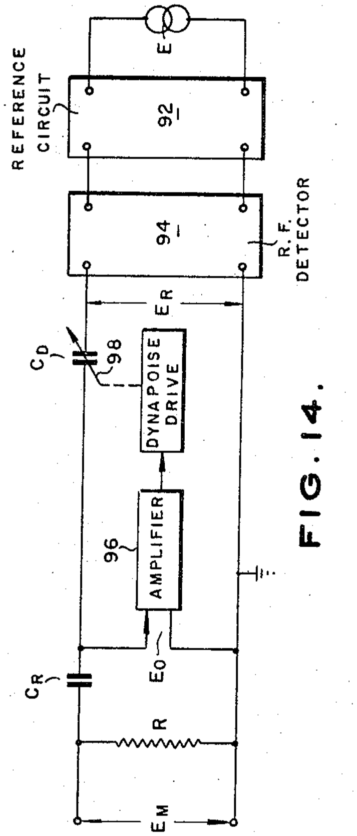
FIG. 14 is an electrical schematic diagram illustrating the manner in which the moisture content of each bale of rubber is indicated.

As shown in FIG. 14, the voltage $E_M$ is compared with the voltage $E_R$ from a reference circuit 92. The components of the reference circuit 92 are fixed as are all the components of the measuring circuit except the measured capacitance of the baled rubber. The output of the reference circuit 92 is fed to an RF detector 94. The output from the detector 94 is the voltage $E_R$.

The reference voltage $E_R$ is fixed. The voltage $E_M$ appearing on the measuring side decreases approximately linearly with measured capacitance increases. These two voltages constitute two lower arms of a bridge with the upper arms consisting of the reference capacitor $C_R$ and the self-positioning capacitor $C_D$. The unbalance voltage $E_o$ is amplified by amplifier 96 and fed to the self-positioning mechanism until $C_D$ returns the bridge to the balanced condition, causing $E_0$ to become zero. A pen mechanism 98 is attached to a shaft of the self-positioning capacitor $C_D$ and records the degree of unbalance originally appearing in the bridge by the difference between the voltages $E_M$ and $E_R$. The value of the capacitance of the rubber bale is a function of the difference between voltages $E_M$ and $E_R$. The moisture content of the rubber bale is, in turn, a function of the capacitance.

We claim:

1. A system for use in indicating the moisture content of a particulate material under pressure comprising:
   wall means forming a chamber with an open top for receiving the particulate material;
   a pressure-operated cover member movable horizontally from a retracted position to a position to close the top of the chamber, said cover member and a portion of said chamber constituting a portion of one plate of a capacitor;
   a hydraulic pressure-operated member mounted in the chamber to move vertically which supports the particulate material and applies pressure to the particulate material when actuated;
   an insulating dielectric mounted on the pressure-operated member;
   a capacitor plate mounted on the insulating dielectric, the dimensions of the capacitor plate and the dimensions of the insulating dielectric being such that the capacitor plate is insulated from the pressure-operated member; and
   electrical means operatively connected to each of said capacitor plates for indicating the capacitance of the particulate material under pressure.

References Cited

UNITED STATES PATENTS

| | | | |
|---|---|---|---|
| 2,231,035 | 2/1941 | Stevens et al. | 324—61 |
| 2,520,394 | 8/1950 | Franzen-Lutz et al. | 324—65 |
| 2,993,168 | 7/1961 | Burnette | 324—61 |
| 3,005,153 | 10/1961 | Berkley et al. | 324—65 |
| 3,090,004 | 5/1963 | Breen et al. | 324—61 |

RUDOLPH V. ROLINEC, *Primary Examiner.*

WALTER L. CARLSON, *Examiner.*

E. E. KUBASIEWICZ, *Assistant Examiner.*